June 14, 1966 J. A. DEVINE 3,256,142
FOURDRINIER BELT
Filed Sept. 5, 1963
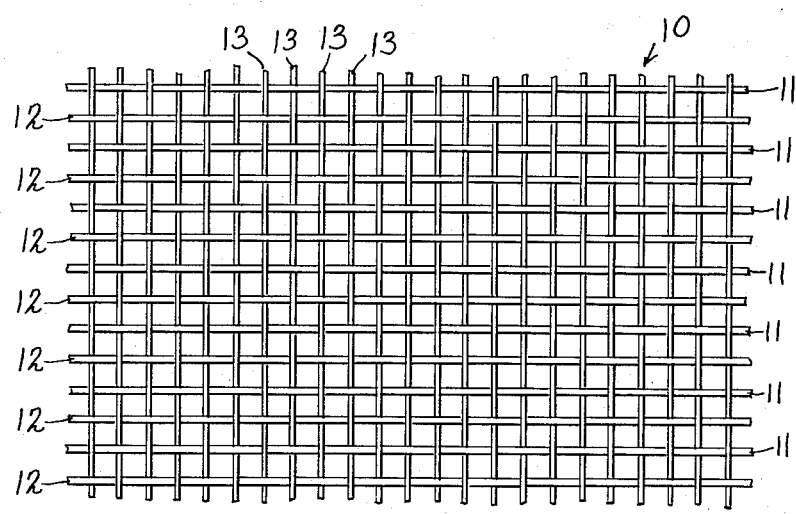
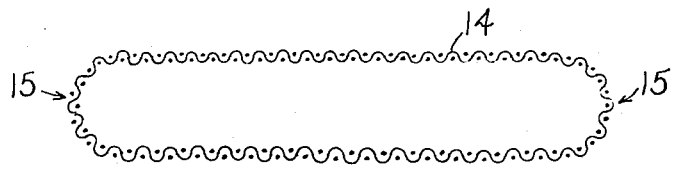
INVENTOR
John Austin Devine
BY Rockwell & De Lio
ATTORNEYS 3,256,142
FOURDRINIER BELT
John Austin Devine, Hamden, Conn., assignor to Mc-
Cluskey Wire Co., Inc., New Haven, Conn.
Filed Sept. 5, 1963, Ser. No. 306,790
6 Claims. (Cl. 162—348)

This invention relates to wire cloth and more particularly relates to wire cloth or fabric such as is used in Fourdrinier machines.

Fourdrinier fabric has been made of interwoven fine wires of copper or its alloys, bronze or brass. When subjected to use as an endless belt in a papermaking machine the relatively soft wires of copper or its alloys wear rapidly and this wear is accelerated by corrosive action of the paper stock on the fabric. Where such Fourdrinier fabric is utilized in papermaking machines there is deterioration of the fabric due to flexing, corrosion, and especially abrasion, and replacement of the endless belt after only a short operating period is necessitated. To overcome the deficiencies of the use of Fourdrinier wire-cloth endless belts made of copper and its alloys, Fourdrinier wire-cloth has been made with the warp or lengthwise strands thereof comprising stainless steel wire or wires of stainless steel and copper or one of its alloys. Such construction has attempted to combine the advantageous characteristics of the different wires while minimizing their disadvantageous characteristics.

In practice Fourdrinier wire-cloth is formed into an endless belt by brazing or welding the ends of the warp wires of a length thereof together to form a conveyor belt designed to carry paper stock. In such application and environment the warp wires are subjected to loading which flexes the wires and thereby tends to work harden and abrade the wires. Additionally the warp wires are subjected to corrosive action. The shute or cross wires are not, to the same degree subjected to the harmful influences exerted on the warp wires.

Warp wire used in making Fourdrinier wire cloth should have high corrosion resistance, good weavability, high flex life, high resistance to abrasion, and must be brazable or weldable so that the wire-cloth may be joined at the ends of a section thereof to be formed into an endless belt and thereby form a conveyor belt. As pointed out above an ever-existing problem has been that available materials for the wire in Fourdrinier wire-cloth have had good characteristics in some of the aforementioned areas but have poor characteristics in other areas.

Accordingly, the present invention provides a new and improved Fourdrinier wire-cloth that possesses all the necessary characteristics for long service in an endless belt in papermaking machines.

An object of this invention is to provide a new and improved Fourdrinier wire cloth.

Another object of this invention is to provide a new and improved endless belt of wire cloth for use in papermaking machines.

The features of the invention which are believed to be novel are pointed out with particularity and distinctly claimed in the concluding portion of this specification. The invention, however, both as to its organization and arrangement together with further objects and advantages thereof may best be appreciated by reference to the following detailed description taken in conjunction with the drawing in which FIG. 1 illustrates section of Fourdrinier wire fabric greatly enlarged to facilitate disclosure of the invention; and FIG. 2 illustrates a side view of an endless belt formed of the fabric of FIG. 1.

Warp wire of a Fourdrinier wire-cloth endless belt, that is, the wire running the length of the belt, should have high corrosion resistance, good weavability, high flex life, high resistance to abrasion and must be brazable or weldable in order that the ends of the section of the wire cloth can be joined to make the conveyor belt endless. Materials that have had good characteristics in some of these areas, fall short in other areas.

The present invention provides a Fourdrinier wire-cloth which may be formed into an endless belt which is composed of a blend of two materials to make a cloth that has all of the desirable features enumerated above even though the individual strands or wires of the cloth do not individually possess these features. FIG. 1 illustrates a section of wire-cloth 10 composed of alternately interspaced warp wires 11 and 12 and shute wires 13, and FIG. 2 illustrates an endless belt 14 formed of the wire cloth of FIG. 1.

In accordance with the invention the warp wires are of different materials. The warp wires 11 are of stainless steel. Stainless steel has the characteristics of good corrosion resistance, good weavability, high abrasion resistance and is brazable, but has poor flex life due to gradual hardening of the stainless steel from repeated flexing and bending. This flexing and bending primarily occurs where the endless belt turns over rollers, not shown, as indicated at 15.

Warp wires 12 are selected to overcome the deficiency inherent in conveyor belts of Fourdrinier wire-cloth due to the use of the stainless steel warp wires. I have discovered that a Cobalt-Chrome-Nickel alloy which has the characteristics of high corrosion resistance, good weavability, high abrasion resistance and additionally possesses a high flex life which complements the desired characteristics of the stainless steel and supplements the poor characteristics of the stainless steel, greatly increases the life of an endless Fourdrinier wire conveyor belt. The Cobalt-Chrome-Nickel alloy cannot be suitably brazed in a satisfactory manner for Fourdrinier use. However, the brazability of the stainless steel augments this deficiency in the alloy.

I have found that by blending these two materials in interspaced warp strands a wire-cloth is provided having all the necessary characteristics for long life, when formed into an endless belt, in papermaking machines. The long flex life of the Cobalt-Chrome-Nickel alloy imparts this desirable characteristic to the finished cloth and the brazability of the stainless steel makes it possible to put a seam in the cloth so that it may be endless and suitable for conveyor usage. An additional advantage of this composite wire cloth is that it gives a wire-cloth which is much less susceptible to damage than wire-cloths formed of conventional materials.

While the drawing illustrates a wire cloth wherein the stainless steel warp wires and the Cobalt-Chrome-Nickel alloy warp wires are alternated it is to be understood that the alloy wires and stainless steel wires may be utilized in other combinations such as one alloy wire for every two stainless steel wires. It is to be understood that the warp wires utilized as disclosed in a regular weave wire cloth may be utilized in other weaves such as semi-twill, full-twill or any other weave of wire-cloth and can be used with round, flat, elliptical or other shaped wires.

In the present invention, the composition of the shute wires is not critical. Almost any wire can be used as the shute wires. For example, wire cloth for Fourdrinier use has been made using shute wires of bronze, stainless steel, brass, nickel-plated brass, and others. I have found that an alloy which satisfactorily complements the desirable characteristics of stainless steel and supplements the characteristics of stainless steel found undesirable, is a predominantly Cobalt-Chromium-Nickel alloy as disclosed in U.S. Patent 2,524,661. This preferred Cobalt-Chromium-Nickel alloy consists essentially of carbon up to 0.30%, beryllium from 0.01 to 0.09%, manganese up to 3.0%, nickel from 5 to 30%, iron up to 18%, with the sum of the nickel, iron and manganese being 20 to 50%, and the remainder cobalt, chromium, and molybdenum, with the cobalt from 20 to 50%, the chromium 15 to 30% and the molybdenum being 21 to 37%. This alloy has a solution-annealed condition of hardness below 300 (Vickers). This alloy is commercially available in wire form in the following composition:

|  | Percent |
|---|---|
| Cobalt | 40 |
| Chromium | 20 |
| Nickel | 15 |
| Molybdenum | 7 |
| Manganese | 2 |
| Carbon | 0.15 |
| Beryllium | 0.04 |
| Iron | Balance |

Such wire is available from the Elgin National Watch Company under the trademark "Elgiloy." The stainless steel and the alloy wires may be woven in any suitable manner to form the wire fabric. The stainless steels suitable for Fourdrinier applications may be classified as Chromium, Nickel, Austenitic grades. A preferred stainless steel wire is type 316 ELC.

To form the resultant wire cloth into an endless belt suitable for Fourdrinier use the ends of a length of a section of wire are held in suitable proximity and the ends of the warp wires are brazed together and/or to a shute wire to form a seam transverse to the length of the wire cloth and thus form an endless belt 14, as shown in FIG. 2, which is suitable for placement on a Fourdrinier paper machine to receive and transport paper stock over various water removal devices on the machine. The ends of the cloth may be dipped into a strong sulphuric acid solution to clean and etch the ends of the warp wires prior to brazing. The resultant belt thus formed has good flexing and abrasive resistant properties which will stand up in the service intended over a long period of time.

By way of example only, the warp wires may vary from .005" to .020" and shute wires from .006" to .020". These size wires have been used in various combinations of warp and shute wire sizes from 100 mesh to 24 mesh. A typical construction would be a cloth having 70 warp wires per inch of .0078" diameter and 56 shute wires per inch of .0085" diameter. Many combinations of warp and shute giving both square and rectangular mesh openings are used.

While the wire cloth as described has good corrosion resistance, in cases and applications where the wire cloth will be exposed to particularly corrosive materials the warp wires 11 and 12 and the shute wire 13 may be coated with plastic or other material or the finished cloth coated after weaving thereof.

While a preferred embodiment of the invention has been disclosed it will be understood that modifications and variations may be made thereto without departing from the spirit and scope of the invention. Accordingly the appended claims are intended to cover all embodiments and modifications of the disclosed embodiment of the invention which do not depart from the spirit and scope of the invention.

What is claimed is:

1. A Fourdrinier wire fabric endless belt comprising interwoven warp and shute wires, the warp wires being alternately stainless steel wire and Cobalt-Chromium-Nickel alloy wire, the ends of the warp wires being joined together at opposite ends of the wire cloth to form the endless belt.

2. A Fourdrinier wire fabric endless belt comprising interwoven warp and shute wires, the warp wires being interspaced stainless steel wire and Cobalt-Chromium-Nickel alloy wire, the ends of the warp wires being joined together at opposite ends of the wire cloth to form the endless belt.

3. A Fourdrinier wire fabric endless belt comprising interwoven warp and shute wires, the warp wires being interspaced stainless steel wire and Cobalt-Chromium-Nickel alloy wire, the ends of the warp wires being joined together at opposite ends of the wire cloth to form the endless belt, said alloy consisting essentially of carbon up to 0.30%, beryllium from 0.01 to 0.09%, manganese up to 3.0%, nickel from 5 to 30%, iron up to 18%, with the sum of the nickel, iron, and manganese being 20 to 50%, and the remainder cobalt, chromium, and molybdenum, with the cobalt from 20 to 50%, the chromium 15 to 30%, and the molybdenum 1 to 10%, and the sum of the chromium and molybdenum being 21 to 37%, said alloy having in solution-annealed condition a hardness below 300 (Vickers).

4. The wire of claim 3 wherein said stainless steel and said alloy wires are alternately interspaced.

5. A Fourdrinier wire fabric endless belt comprising interwoven warp and shute wires, the warp wires being interspaced stainless steel wire and Cobalt-Chromium-Nickel alloy wire, the ends of the warp wires being joined together at opposite ends of the wire cloth to form the endless belt, said alloy consisting essentially of 0.15% carbon, 0.04% beryllium, 2% manganese, 15% nickel, 7% molybdenum, 20% chromium, 40% cobalt, and the remainder iron.

6. The wire of claim 5 wherein said stainless steel and said alloy wires are alternately interspaced.

References Cited by the Examiner

UNITED STATES PATENTS

| 1,800,872 | 4/1931 | Peterson | 139—425 |
| 3,100,729 | 8/1963 | Goller | 148—12.3 |

DONALL H. SYLVESTER, *Primary Examiner.*

J. H. NEWSOME, *Assistant Examiner.*